Figure 1:
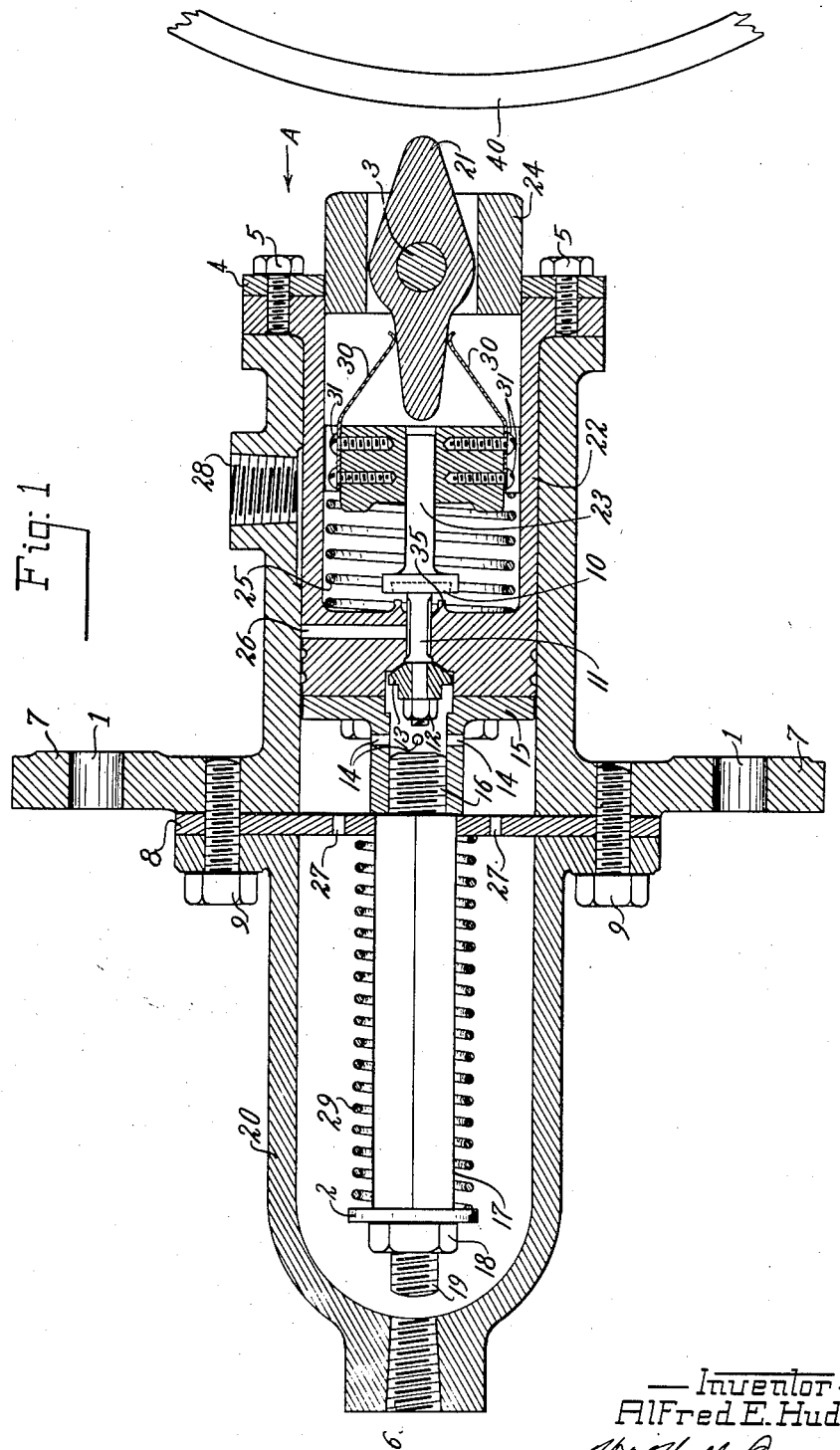

Dec. 18, 1934.  A. E. HUDD  1,984,679
STOP DETECTOR
Filed May 2, 1928  2 Sheets-Sheet 2
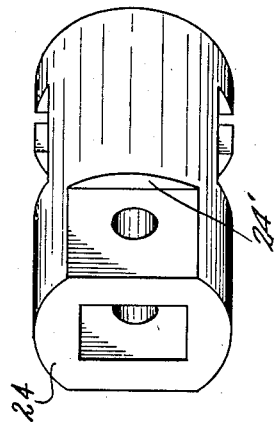
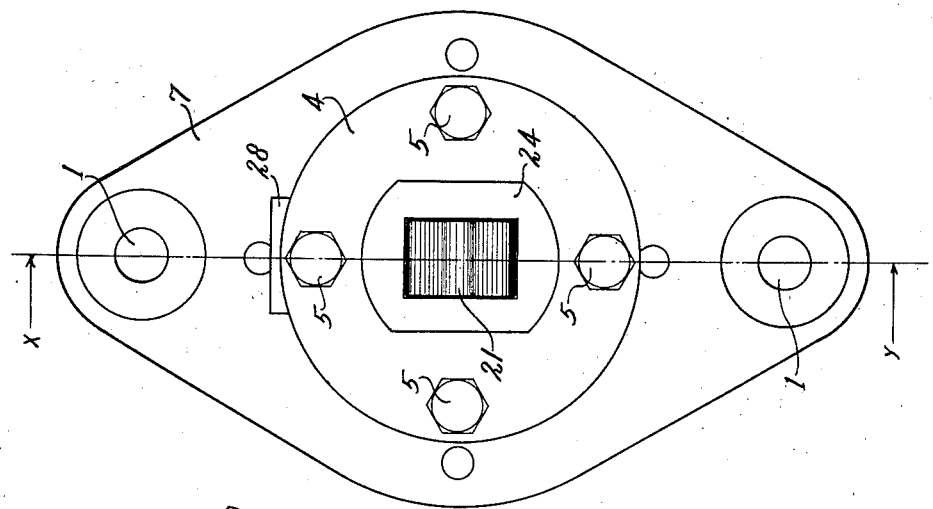
Inventor
Alfred E. Hudd
Wm Walter Owen Atty.

Patented Dec. 18, 1934

1,984,679

UNITED STATES PATENT OFFICE 1,984,679

STOP DETECTOR

Alfred E. Hudd, Evanston, Ill., assignor, by mesne assignments, to Associated Electric Laboratories, Inc., Chicago, Ill., a corporation of Delaware Application May 2, 1928, Serial No. 274,412

13 Claims. (Cl. 303—1)

The present invention relates in general to stop detectors, but is particularly concerned with the construction and design of a pneumatic stop detector of the general type disclosed in the co-pending Hudd application, Serial No. 170,048, filed February 21, 1927.

The objects of the present invention are to provide devices of the foregoing character which are very reliable, economical in the use of compressed air, readily accessible for replacement or repair of parts and of very rugged construction.

Referring now to the drawings, Fig. 1 is a plan view in cross section, taken on lines X—Y of Fig. 2; Fig. 2 is an end view in elevation as seen when looking in the direction indicated by arrow A of Fig. 1; while Fig. 3 is a perspective of a detail not sufficiently disclosed in Figs. 1 or 2.

The stop detector consists of a flanged cylinder 7, into which is inserted a piston 22. This piston 22 has within it a detector piston 24. Within this detector piston is rotatably secured, by pin 3, a valve actuator 21. Segments of the detector piston 24 are cut away as shown in Figs. 1 and 3, and actuator springs 30 are secured thereto to hold the valve actuator in proper alignment. The piston 24 is held within the piston 22 by a stop and guard plate 4 secured to the piston 22 by a number of machine screws 5. By reference to Fig. 3 it will be seen that a limited portion of the piston 24 is also cut away to form shoulders 24', which will encounter the stop and guard plate 4 and definitely limit the outward movement of the piston. The piston 24 is held firmly against this guard plate by a compression spring 25, within the piston 22 and pressing against the left end of the piston 24.

A valve stem 23 extends into the left portion of the detector piston 24 and out through the left portion of the piston 22. This stem is provided with a leather washer 10 for engaging a raised portion 35 of the piston 22 when the piston 22 moves to the right as will subsequently be described. At the left end of the stem 23 is also secured a valve 13. In a solid portion of the wall of piston 22 an air duct 26 extends, from a fluted portion 11 of the stem 23, to the wall of the cylinder 7. This portion of the wall of the cylinder is solid however and therefore the opening 26 is normally blanketed. Onto the left end of the piston 22 is secured a piston head 15, which has perforations 14 for admitting air to the valve 13.

The piston head 15 has a threaded portion for receiving a guide bolt 17. Upon this guide bolt is placed a stop plate 8, having a square opening A compression spring 29 surrounds the bolt 17 and is held in place slightly compressed, by steel washer 2 and nut 18. This latter part of the assembly is completely covered over, and with the stop plate 8, is held in place by a number of machine screws 9.

The operation of the device, which will enable a better understanding of the invention, will now be given. For this purpose it will be assumed that, through the medium of holes in the flanges of the cylinder 7, it is firmly secured in a definite fixed relation to the periphery 40 of a rotatable element. It will further be assumed that a pneumatically operable device is connected with the exhaust opening 28 and that a source of air pressure is available for application to the intake opening 6 to supply air to the stop detector assembly at will.

It will first be assumed that when air is supplied to the opening 6 the element 40 is stationary. Under this condition the air supplied through opening 6 builds up in the air chamber 20, passes through ports 27 in stop plate 8 and against the piston head 15. It will be noted that the ports 14 are open permanently, but little or no air passes beyond valve 13 because, if it is open at the time air is applied to it, it is instantly closed by the air pressure and this pressure simply assists in keeping the valve 13 on its seat.

As the pressure builds up piston 22, carrying piston 24 with it, moves forward until the valve actuator 21 encounters the rotatable element 40. When the valve actuator 21 encounters the rotatable element (assumed to be stationary at this time), further movement of the detector piston 24 is prevented. However, the piston 22 continues to move forward and as it does so valve stem 23 encounters and is stopped by the valve actuator 21. As the piston 22 continues its movement valve 13 remains stationary, but its associated seat, being a part of the piston 22, continues to move forward until the port 26 is in alignment with the opening 28. Air pressure applied to the input opening 6 may now freely pass to the exhaust opening 28 via valve 23 and port 26, to bring about the operation of any pneumatic apparatus which may be connected therewith.

It will be noted that shortly following the opening of valve 13 the raised portion 35 of the piston 22 encounters the leather washer 10. This prevents further forward movement of the piston and prevents a waste of air past the stem 23 at this point.

Upon release of piston 22 air may be exhausted from the passage 28 either by a normally open passage through piston 22, not shown, or by any well known manual valve external to the arrangement shown.

We will now assume that at the time air is supplied to the inlet opening 6 that the element 40 is rotating. Under this condition, as soon as the valve actuator 21 encounters the element 40 the valve actuator is deflected out of range of the stem 23. Since the valve actuator 21 is not encountered by the stem 23 the stem continues movement with the piston and not being raised, valve 13 will not open and although the port 26 may come into alignment with the port 28 no air can escape owing to the closed condition of valve 13. Consequently the pneumatic device connected with the opening 28 cannot receive air pressure for its operation.

The stop detector is restored by removing the air pressure from the inlet opening 6. When this occurs spring 29, compressed during the forward movement of the piston 22, restores the piston to its initial position, while the spring 25, also compressed during the forward movement of the piston 22 and after the piston 24 ceased movement, restores the piston 24 to its initial position with respect to the piston 22. Of course, in cases where the valve actuator 21 has been tilted, owing to its having encountered a moving element, springs 30 function also, to restore it to its normal position.

From the foregoing it will be appreciated that applicant has invented a much needed device of the character described, which can be depended upon to accomplish the results intended.

What is claimed is:

1. In a valve structure, a cylinder, a piston in said cylinder, a second piston within the first, a valve having an operating stem within said pistons, a valve actuator, said pistons being operable to cause said valve actuator to be encountered by said stem to actuate said valve.

2. In a valve structure, a cylinder, a piston in said cylinder, a second piston within the first, a valve having an operating stem within said pistons, a valve actuator, said pistons being operable to cause said valve actuator to be encountered by said stem to actuate said valve, and means for preventing the movement of said pistons from causing the actuation of said valve to occur in certain instances.

3. In a valve structure, an air input port and an exhaust port, a plurality of restrictions in an air path between said ports comprising poppet and slide valves, said valves actuated by air supplied to the input port.

4. In a valve structure, an air input port and an exhaust port, a plurality of restrictions in an air path between said ports comprising poppet and slide valves, said valves actuatable by air supplied to the input port, and means for preventing the said first means from actuating one of said valves in certain instances.

5. In a valve assembly, a housing consisting of a cylinder and air chamber, a piston within said cylinder, means in said air chamber for restoring said piston following its operation, a second piston carried within the first, and means for at times causing one of said pistons to move relative to the other responsive to the application of air to said air chamber.

6. In combination with a movable element, a valve, valve operating means cooperating with said element, means for supplying fluid pressure to said means, means responsive to the application of fluid pressure for operating said valve to cause the escape of fluid therethrough only if the movable element is stationary.

7. In a mechanism for detecting whether a device is in motion or stationary, a member, means for applying pressure to said member to move it in a normal direction towards the surface of such device, and means in said mechanism carried by said member operated responsive to such movement only in case such device is stationary.

8. In a mechanism for detecting whether a device is in motion or stationary, a pneumatically operable piston, a valve and valve actuator carried by said piston, and movable means engaged by said actuator to cause or prevent further movement of said piston from causing the actuator to actuate said valve dependent on the state of said movable means.

9. In a valve, a pneumatically operable element, an air release member associated with said element, an actuator for said air release member, and means effective upon movement of said element for either causing said actuator to operate or prevent it from operating said air release member, depending on the condition of said means.

10. In a mechanism, a movable element, a second movable element associated with the first, an actuator for said second movable element, and means effective upon movement of said first element for either preventing said actuator from operating said second element or causing it to operate the element, depending on the condition of said means.

11. A resetting device comprising a casing, means slidable in the casing including a slidable stem, a trip member pivoted to said stem and adapted to be drawn into said casing to aline with the stem and to be projected into contact with a relatively movable part for swinging said trip member, and resetting effecting means operable when said stem is moved to bring said trip member against said part without said trip member being swung.

12. A resetting device comprising a cylinder, a piston slidable in said cylinder, a second piston slidable in the first-named piston and having a stem adapted to be projected from the cylinder, a trip member pivoted to said stem to be moved into contact with a relatively movable part, and resetting effecting means operable when said pistons are moved and the second piston is limited in its movement by the contact of the trip member with said part without said trip member being swung relatively to said stem.

13. A resetting device for automatic train control comprising vehicle carried means including a member mounted for sidewise movement and endwise movement into and out of engagement with a movable part, means for projecting the member into engagement with the part, said member movable sidewise when engaging said part while the vehicle is moving, and having no sidewise movement when the part is engaged while the vehicle is stationary, and means for supplying fluid pressure to a resetting device only when the vehicle is stationary.

ALFRED E. HUDD.